July 27, 1965
J. A. DUDEK ETAL
3,197,389
METHOD FOR FABRICATING SELF-MODERATING
NUCLEAR REACTOR FUEL ELEMENT
Original Filed Dec. 15, 1959
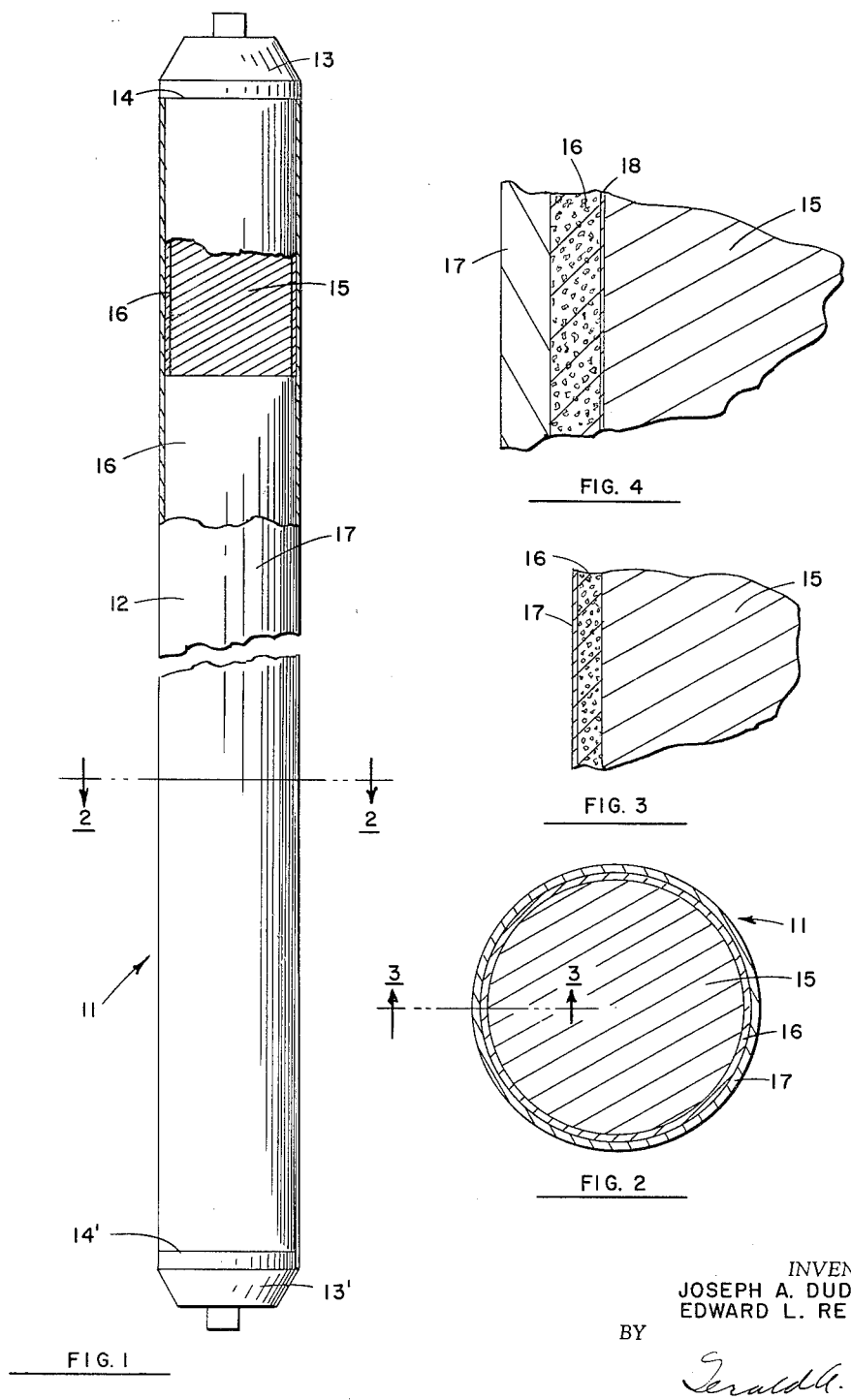
INVENTORS
JOSEPH A. DUDEK
EDWARD L. REED
BY
ATTORNEY

United States Patent Office 3,197,389
Patented July 27, 1965

3,197,389
METHOD FOR FABRICATING SELF-MODERATING NUCLEAR REACTOR FUEL ELEMENT
Joseph A. Dudek and Edward L. Reed, Woodland Hills, Calif., assignors, by mesne assignments, to the United States of America as represented by the United States Atomic Energy Commission
Original application Dec. 15, 1959, Ser. No. 859,815. Divided and this application May 10, 1963, Ser. No. 285,175
1 Claim. (Cl. 204—1.5)

This is a division of application Serial No. 859,815, filed December 15, 1959, now U.S. Patent 3,170,847 issued February 23, 1965. Our invention relates to a method for the manufacture of a self-moderating nuclear reactor fuel element.

The theory, construction, and operation of nuclear reactors is well known in the art and may be found in such references as "Principles of Nuclear Reactor Engineering" by Samuel Glasstone, published by D. Van Nostrand Company, Inc., Princeton, New Jersey, First Edition, 1955; "The Proceedings of the Geneva Conference on the Peaceful Uses of Atomic Energy" held in Geneva, Switzerland, August, 1955, available for sale at the United Nations Bookstore, New York City, New York; and U.S. Patents 2,708,656 and 2,714,577, Fermi et al. When a nuclide undergoes fission in a nuclear reactor, a larger quantity of the energy liberated appears in the form of heat. In the case of a power reactor, the heat liberated is used to perform useful work. A major problem in any reactor power source is the fuel and moderator element. One problem encountered is to design a fuel element such that the temperature difference between the coolant which flows around the element and the element center is reduced to a minimum at any designed heat flux. Another problem is to design a fuel element which will result in reduced radiation damage to the moderator material employed.

It is, therefore, an object of this invention to provide a composition of matter which can be modified to serve as a nuclear reactor fuel element. It is also an object of this invention to provide a reactor fuel element assembly which performs the triple function of moderator, end reflector, and fuel. Another object is to provide a fuel element which will have the characteristic of exhibiting a reduced temperature difference between the coolant flowing around the element and the element center at any particularly desired heat flux. Another object of this invention is to provide a fuel element which is less susceptible to radiation damage of the moderator material. It is also an object of this invention to provide a process for the preparation of a compositon of matter which can be modified to serve as a nuclear reactor fuel element. Still other objects of this invention will become apparent from the discussion which follows.

The objects of this invention are accomplished by an article of manufacture comprising an electrically conductive core material encompassed by a layer of electrically conductive material containing interspersed therethrough a radioactive element-containing substance, An example of such an article is a cylindrical core of metal hydride with a layer of a nuclear reactor fuel such as uranium oxide in a matrix of a good heat-conducting material such as copper on the surface of the core. Preferably, the uranium oxide impregnated copper is in intimate contact with the metal hydride central cylinder, which contact can be achieved by bonding by methods well known in the art. For example, when the outer layer matrix is copper and the central moderator material is zirconium hydride, sufficient contact is obtained between the copper and the zirconium hydride by merely plating a thin layer of copper on the core in a copper strength solution.

Although the above description has been made with reference to a cylindrical core, the shape of the article is not intended to be limited to that of a cylinder. The article of this invention can be in the form of flat plates, or any other outer shape.

The amount of electrically conductive metal employed to bind together the radioactive fuel particles need only be sufficient to impart a good heat transfer characteristic to the fuel and matrix layer. This is accomplished by a composition in which the atom ratio of radioactive fuel-to-binding metal in said layer is from about 1:1 to about 1:12. For more satisfactory transfer, it is preferred that the atom ratio of radioactive fuel-to-binding metal be in the range of from about 1:3 to about 1:7. For example, good heat transfer characteristics are obtained in an uranium oxide-copper layer when the atom ratio of uranium-to-copper is substantially 1:5.3.

In order to protect the article from corrosion, it may have an outside layer of a protective metal such as nickel. For example, a nuclear reactor fuel element may be composed of a zirconium hydride core on which is deposited a layer of uranium oxide in a copper matrix, and this, in turn, is covered with a protective layer of nickel.

Various moderator core materials may be used in the manufacture of a nuclear reactor fuel element. Preferably, the material is composed of carbon, a metal, hydrides or oxides of a metal, or mixtures of two or more of these components, wherein the carbon or metal has a neutron capture cross section in the range of from about 0.0032 to about 2.5 barns. The lower limit represents a neutron capture cross section of carbon whereas the 2.5 barns is the neutron capture cross section for molybdenum and ruthenium. Non-limiting examples of elements that can be used as a moderator include carbon, beryllium, magnesium, aluminum, iron, zinc, germanium, rubidium, strontium, yttrium, zirconium, titanium, niobium, tin, barium, cerium, lead, and bismuth. Hydrides of these elements such as zirconium hydride, yttrium hydride, and titanium hydride as well as oxides of these elements such as beryllium oxide, magnesium oxide, and alumina can also be used. Examples of carbide moderator are zirconium carbide, titanium carbide, and yttrium carbide.

The radioactive elements that can be employed are the radioactive elements which are well known to those skilled in the art. When the article is a fuel element for a nuclear reactor the radioactive elements that can be employed are those of Series VII of the Periodic Table of Elements which includes uranium, thorium, plutonium, etc. The oxides of these elements such as uranium oxide, thorium oxide, and plutonium oxide can also be used. In addition, the hydrides of the elements, as well as the hydride of alloys containing such radioactive elements, can be employed. Non-limiting examples of the hydrides are the hydrides of an alloy of uranium, zirconium and yttrium; and the hydrides of an alloy of uranium, molybdenum and thorium. Still other compositions which can be used as particle components to be dispersed in a suitable matrix are carbides such as uranium carbide, thorium carbide, and plutonium carbide. A mixture of two or more of the above components may also be employed.

The metals or combination of different metals which can serve as a matrix in which the radioactive nuclides or elements are dispersed include such elements as copper of Group IB of the Periodic Table of the Elements; beryllium, magnesium, zinc, and strontium of Group II; aluminum, yttrium, and lanthanum of Group III; titanium, zirconium, germanium, and lead of Group IV; vanadium, niobium, tantalum, and bismuth of Group V; chromium, molybdenum, and tungsten of Group VI; and iron, nickel, palladium, and platinum of Group VIII of the Periodic Table of the Elements as shown in the "Handbook of Chemistry and Physics," pages 392 and 393, published by the Chemical Rubber Publishing Co., Cleveland, Ohio, 37th Edition, 1955. Alloys of these compositions may also be used as a matrix to bind the radioactive nuclide-containing particles. The requirement is that the matrix have a good heat transfer characteristic so that the heat produced by the radioactive elements due to radiation or fission will be readily conducted to the outer surface of the article where it can be taken away by suitable heat transfer media.

The thickness of the electrically conductive matrix and radioactive material varies from about 0.0002 inch to about 0.1 inch and thicker as desired, depending on the service in which it is to be placed.

The material used to coat the article in order to protect it from possible corrosion can be any of the metals named above that serve as a matrix for the radioactive nuclide, of which such elements as nickel, chromium, steel, molybdenum, and tantalum are found to be suitable. The protective coating varies in thickness from about 0.0001 inch to about 0.1 inch.

In general, the process by which the article of this invention is prepared comprises providing an electrically conductive core material and electrophoretically depositing a radioactive substance of a particle size of from about 0.3 to about 100 microns in diameter on the core material in a layer of predetermined thickness or until the electrophoretic deposition substantially ceases. A particle size of from about 0.3 to about 50 microns in diameter is preferred in order to minimize the danger of precipitation. This provides a layer of porous radioactive material on the electrically conductive core material. An electrically conducting matrix material of the type mentioned above is then deposited electrolytically in the pores of the electrophoretically deposited radioactive substance so as to provide a matrix of conductive material containing interspersed therethrough the radioactive substance material. Any electrically conductive material such as copper, for example, may first be plated out on the core material to form a layer of from about 0.00005 inch to about 0.1 inch or more thick in order to make the core material a better electrode for the electrophoretic deposition of the radioactive particles. The cycle of electrophoretically depositing the radioactive-containing particulate substance followed by electrolytic deposition of a metal or alloy may be repeated any number of times dependent upon the thickness of conductive material containing interspersed radioactive material desired. Finally, a layer of protective metal is electrolytically deposited on the surface of the article, that is, deposited on the surface of the layer made up of the electrically conductive matrix containing the radioactive material. This surface layer is composed of any one of the metals or alloys of metals used to serve as the matrix. The purpose of the surface layer is to protect the article from corrosion and, therefore, a substance such as nickel is found to be suitable in this instance.

A non-limiting example of the article of manufacture of this invention is shown in the accompanying drawing. FIG. 1 shows the cylindrically-shaped fuel element made by the process of this invention. FIG. 2 is a radial cross-sectional view of the fuel element taken along line 2—2 of FIG. 1, while FIG. 3 is a segment of an axial cross-sectional view taken along line 3—3 of FIG. 2. The segment shown in FIG. 4 is an enlarged version of the segment shown in FIG. 3 with a modified layer structure.

In FIG. 1, the cylindrically-shaped fuel element 11 consists of a rod-shaped central portion 12 and end cap pieces 13 and 13' at both ends of the central body section 12. The end pieces are welded to the central body section at seams 14 and 14'. The element is made up of a central core material 15 encased in a layer 16 of electrically conductive metal containing interspersed therethrough a nuclear reactor fuel-containing material. Covering the latter layer, is a sheath 17 of a protective electrically conductive metal.

FIG. 2 represents a radial cross-sectional view of the cylindrical fuel element of FIG. 1 taken along line 2—2. In this figure, the fuel element 11 is seen to be made up of a central rod-shaped moderator core material 15. Numbers 16 and 17 refer to parts as described in reference to FIG. 1.

An enlarged segment of a cross-sectional view of the fuel element of FIG. 2 taken along line 3—3 is shown in FIG. 3. This figure shows the core 15, the nuclear fuel-containing layer 16, and the cladding 17.

FIG. 4 is an enlarged version of the segment shown in FIG. 3. The components are distorted with respect to relative dimensions for purposes of illustration. FIG. 4 illustrates a modified version of the element in that there is a thin layer 18 of electrically conductive material between the core 15 and the metal oxide-containing layer 16.

The article and process of this invention are more fully described in the non-limiting examples which follow.

EXAMPLE I

A slurry composed of five parts of powdered uranium dioxide in about eight parts of isopropyl alcohol were added to a ball mill and the mill operated for a period of 72 hours until the particles of uranium dioxide were of a size of from about 0.3 microns to about 50 microns in diameter. After 72 hours of grinding in the ball mill, the contents were removed to a storage vessel and 80 parts of additional isopropyl alcohol were added. The mixture was stirred until uniform throughout. To the mixture was then added 0.1 part of concentrated HCl to serve as an electrolyte and the mixture agitated until a uniform composition was obtained. The uranium oxide-isopropyl alcohol mixture was then added to an electrolytic cell in which the container, made of steel, served as the cathode and a cylindrical rod of zirconium hydride served as the anode. The zirconium hydride used as the anode was prepared by subjecting zirconium massive metal of the required shape to highly purified hydrogen gas in a furnace at 1700° F. The zirconium hydride was 4.592 inches long and had a diameter of 0.4001 inch, and weighed 61.1926 grams. The solution was kept in constant agitation so as to keep the uranium oxide uniformly distributed throughout the isopropyl alcohol. A potential of substantially 1200 volts was maintained across the cell electrodes consisting of the zirconium hydride and the container walls. The potential caused the deposition of uranium oxide on the zirconium hydride electrode. The deposition continued for approximately five seconds after which time the rate of deposit was negligible. The potential source was disconnected from the cell, the zirconium hydride electrode removed, rinsed with water, dried with alcohol, and the alcohol permitted to evaporate. The electrode with the uranium oxide deposit was then weighed and measured. It was found that an amount equivalent to 0.0334 gram of $UO_2$ had been deposited on the electrode in a layer less than 0.00005 inch in thickness. The electrode was then placed in a copper plating bath and 0.0665 gram of copper plated on to encase the uranium oxide particle deposit and form a layer of uranium oxide dispersed in a copper matrix, in a layer substantially .00025 inch in thickness. This provided a uranium-to-copper atom ratio of substantially 1:8.5. The copper was deposited from a standard plating solution by a process well known in the electroplating art, as described in "Metals Handbook," pages 716 et seq., 1948 Edition, published by the American Society for Metals, Cleveland, Ohio. The plating composition consisted of the following components per gallon of aqueous solution: copper cyanide 6 oz.; total sodium cyanide 7.5 oz.; free cyanide, NaCN, 0.75 oz.; Rochelle salt 6 oz.; and sodium carbonate 4 oz. The plating was carried out at a temperature of 130° F., with a potential drop of 0.5 volt and a current of 0.05 amp for a period of about 2½ hours. After the copper plating, the zirconium hydride electrode with the $UO_2$ and copper layer thereon was removed from the solution, rinsed with distilled water, dried with alcohol, and the alcohol permitted to evaporate.

EXAMPLE II

The process of Example I was repeated with the modification that a layer of copper equivalent to 0.0071 gram was deposited on the zirconium hydride electrode prior to the uranium oxide deposition, and further that the $UO_2$ was electrophoretically deposited at 2500 volts. A nuclear reactor fuel element was obtained consisting of a zirconium hydride moderator core with a layer of uranium dioxide fuel in the amount of 0.0334 gram uniformly dispersed in a copper matrix weighing 0.0736 gram. The thickness of the $UO_2$ and copper was about 0.0002 inch on a zirconium hydride core having a diameter of 0.4001 inch. The atom ratio of uranium-to-copper was substantially 1:9.4.

EXAMPLE III

The procedure of Example I is repeated with the modification that the amount of copper deposited is 0.0079 gram and the amount of $UO_2$ is 0.0334 gram, deposited in the form of particles of from about 0.3 to about 100 microns in diameter, providing a uranium-to-copper atom ratio of substantially 1:1.

EXAMPLE IV

The procedure of Example I is repeated with the modification that a layer of copper equivalent to 0.028 gram is deposited on the zirconium hydride core prior to the $UO_2$ deposition. This provides an over-all uranium-to-copper atom ratio of 1:12.

EXAMPLE V

The procedure of Example II was repeated with the modification that the cycle of depositing first copper and then uranium dioxide was repeated four times with a final deposition of copper so as to provide successive deposits of copper and uranium dioxide in the following amounts: 0.0071 gram copper, 0.0334 gram $UO_2$ deposited at a potential difference across the cell of 1200 volts; 0.0665 gram copper, 0.0242 gram $UO_2$ deposited at 1200 volts; 0.1487 gram copper, 0.0335 gram $UO_2$ deposited at a potenial of 1500 volts; 0.0583 gram copper, 0.3079 gram $UO_2$ deposited at 2000 volts; 0.2816 gram copper electrolytically deposited at a potential difference across the cell of 0.5 volt over a period of 2½ hours. The zirconium hydride electrode with its $UO_2$ and copper deposit was placed in a nickel plating cell containing a solution, as described on page 718 of the "Metals Handbook," supra. A coating of nickel in the amount of 0.0172 gram was plated out on the surface of the last copper deposition to provide a protective layer 0.0001 inch thick. The amount of $UO_2$ on the zirconium hydride electrode was 0.3990 gram dispersed in a copper matrix weighing 0.4957 gram. The total thickness of the copper, $UO_2$, and nickel was 0.0017 inch. The atom ratio of uranium-to-copper was substantially 1:5.3.

The procedure of Example V is repeated with the modification that successive layers of copper and $UO_2$ are deposited to provide a layer of $UO_2$ in a copper matrix substantially 0.1 inch in thickness.

EXAMPLE VI

The procedure of Example V is repeated with the modification that the protective layer is composed of 0.172 gram of nickel and is substantially 0.001 inch thick. Stainless steel caps are welded on at each end of the fuel element as shown in the drawing.

In like manner, the procedure of Example VI is repeated with the modification that a nickel protective layer substantially 0.1 inch thick is provided.

EXAMPLE VII

A zirconium hydride core as described in Example I is covered with a layer of copper equivalent to 0.007 gram. A layer of uranium carbide and molybdenum of a particle size in the range of from about 0.3 to 50 microns is then electrophoretically deposited on the copper-coated zirconium hydride core from an isopropyl alcohol solution as described in Example I in which the ratio by weight of uranium carbide to molybdenum is 0.5. The layer of uranium carbide and molybdenum is equivalent to 0.375 gram of uranium carbide and 0.75 gram of molybdenum. The atom ratio of uranium-to-molybdenum is substantially 1:1.3. A layer of copper equivalent to 0.01 gram is deposited over the uranium carbide and molybdenum. The element with the zirconium hydride core is then placed in a close-fitting copper tube substantially 0.01 inch thick and the copper hydrostatically pressed onto the element with a sodium-potassium medium at a temperature of substantially 1600° C. Steel caps are brazed onto the copper to form an element as shown in the drawing.

In the same manner, nuclear reactor fuel elements are prepared consisting of a moderator core of graphite, a fuel of plutonium oxide dispersed in a matrix of vanadium providing a plutonium-to-vanadium atom ratio of substantially 1:3; a moderator core of yttrium hydride, a fuel of thorium oxide dispersed in a matrix of molybdenum providing a thorium-to-molybdenum atom ratio of substantially 1:7; a moderator core of titanium hydride, a fuel of plutonium carbide dispersed in a matrix of magnesium; a moderator core of a germanium and yttrium mixture, a fuel of hydrided uranium, zirconium and yttrium alloy and uranium oxide dispersed in a matrix of aluminum; a moderator core of beryllium oxide in a matrix of zinc, a fuel of thorium carbide and uranium oxide dispersed in a matrix of zirconium; a moderator core of a bismuth-lead alloy, a fuel of plutonium carbide and uranium oxide dispersed in a matrix of iron, covered with a corrosion resistant layer of tin.

EXAMPLE VIII

Fuel elements are prepared according to the procedure described in Example V in which the zirconium hydride cores are 2.3 inches long and have a diameter of 0.4 inch. An amount of $UO_2$ equivalent to 0.2 gram and an amount of copper equivalent to 0.25 gram is deposited on each element. Stainless steel tubing, having a wall thickness of 0.005 inch and a diameter 0.002 inch less than the diameter of the fuel element, is heated to 1200° F. in order to cause it to expand. The fuel element is then inserted in the tubing and the steel tubing shrink-fitted by cooling. One end of the tubing has a cap welded onto it as shown in the drawing prior to the insertion of the fuel element. The cap at the other end of the element is welded on after the tube is fitted around the zirconium hydride core-containing element. The individual cylindrical fuel elements are assembled into bundles between parallel plates 2.5 inches by 36 inches in dimension and ⅛ inch thick. The plates have holes drilled therein for receiving the end caps of the fuel elements. An assembly of the elements between parallel plates is shown in "Organic Moderated Reactor Quarterly Progress Report" bearing number NAA–SR–2057, pages 39 et seq., available from the Office of Technical Services, U.S. Department of Commerce, Washington 25, D.C. The center-to-center spacing of the individual fuel elements is 0.6 inch. The assembled fuel elements are placed in a fuel box 2.8 inch x 2.9 inch rectangular cross section, of the type described in the text entitled "Solid Fuel Reactors" by Diedrich and Zinn, pages 699 et seq., 1958 edition, published by Addison-Wesley Publishing Company, Inc., Reading, Massachusetts. An organic moderated reactor as described on pages 696 et seq. of the "Solid Fuel Reactors" text, supra, is loaded with these fuel elements to provide enough excess reactivity to compensate for xenon poisoning, temperature, and fuel burnup. The reactor operates satisfactorily.

Although the invention has been described and illustrated in detail, it is to be clearly understood that the same is by way of illustration and example only and is not to be taken by way of limitation, the spirit and scope of this invention being limited only by the terms of the appended claim.

We claim:

A process for the manufacture of a nuclear reactor fuel element comprising providing a zirconium hydride core material, electrolytically depositing a layer of copper on said core, electrophoretically depositing uranium oxide on said copper, and electrolytically depositing copper over said uranium oxide, in an amount such that the atom ratio of said uranium to said copper is from about 1:1 to about 1:12, thereby forming a matrix of copper containing uranium oxide interspersed therethrough, and electrolytically depositing a layer of nickel over said copper matrix.

References Cited by the Examiner

UNITED STATES PATENTS

| 2,848,391 | 8/58 | Fahnoe et al. | |
| 2,864,758 | 12/58 | Shackelford | 176—83 |
| 2,872,388 | 2/59 | Fahnoe et al. | 204—1.5 |
| 2,894,885 | 7/59 | Gray | 204—1.5 |
| 2,938,839 | 5/60 | Fahnoe et al. | 204—1.5 |
| 2,967,811 | 1/61 | Flint | 176—82 |

REUBEN EPSTEIN, *Primary Examiner.*

CARL D. QUARFORTH, *Examiner.*